US00RE42940E

(19) United States
(12) Reissued Patent
Kamimura et al.

(10) Patent Number: US RE42,940 E
(45) Date of Reissued Patent: Nov. 22, 2011

(54) AIR FLOW RATE CONTROL APPARATUS

(75) Inventors: Yasuhiro Kamimura, Hitachinaka (JP); Yasushi Sasaki, Naka-gun (JP); Sadayuki Aoki, Takahagi (JP); Kazuo Nagayama, Hitachinaka (JP)

(73) Assignees: Hitachi, Ltd., Tokyo (JP); Hitachi Car Engineering Co., Ltd., Hitachinaka-shi (JP)

(21) Appl. No.: 12/471,597

(22) Filed: May 26, 2009

Related U.S. Patent Documents

Reissue of:
(64) Patent No.: 5,868,114
Issued: Feb. 9, 1999
Appl. No.: 08/969,708
Filed: Nov. 24, 1997

U.S. Applications:
(63) Continuation of application No. 11/495,659, filed on Jul. 31, 2006, now abandoned, which is a continuation of application No. 09/779,710, filed on Feb. 9, 2001, now Pat. No. Re. 39,257, which is a continuation of application No. 08/583,794, filed on Jan. 16, 1996, now abandoned.

(30) Foreign Application Priority Data

Jan. 17, 1995 (JP) ..... 07-004673
Jan. 19, 1995 (JP) ..... 07-006189

(51) Int. Cl.
*F02D 11/10* (2006.01)
*F16K 31/04* (2006.01)
*F16K 1/22* (2006.01)

(52) U.S. Cl. ..... 123/399; 251/129.11; 251/305

(58) Field of Classification Search ..... 123/357, 123/361, 396, 399, 403; 251/129.11, 304, 251/305; 73/114.36
See application file for complete search history.

(56) References Cited

U.S. PATENT DOCUMENTS 4,679,440 A * 7/1987 Okamura ..... 73/114.36
4,840,349 A 6/1989 Peter et al.
4,850,319 A 7/1989 Imoehl
5,036,816 A 8/1991 Mann et al.
5,074,266 A 12/1991 Kuhn et al.
(Continued)

FOREIGN PATENT DOCUMENTS

DE 34 05 935 A1 5/1985
(Continued)

*Primary Examiner* — Willis R Wolfe, Jr.
(74) *Attorney, Agent, or Firm* — Crowell & Moring LLP

(57) ABSTRACT

A throttle control apparatus for an engine on a vehicle is provided, in which the number of component parts in the position detection means and the driven means is reduced to improve the accuracy in its position control and at the same time an integrated wiring is achieved and connectors are aggregated. The position detection means for detecting the position of a control valve, the driven means for controlling the position of the control valve, the means for processing control signals, an output from the position control means for controlling the position of the control valve are disposed within a sealed space defined by a body supporting a control valve shaft, and a cover. Based on the fact that the number of component parts of the position detection means may be reduced, the mechanical hysteresis and electrical hysteresis may also be reduced to improve the accuracy in controlling the control valve position, and it is possible to aggregate the connectors.

17 Claims, 6 Drawing Sheets

U.S. PATENT DOCUMENTS

| | | | |
|---|---|---|---|
| 5,092,296 | A | 3/1992 | Gunter et al. |
| 5,094,212 | A | 3/1992 | Kawaguchi et al. |
| 5,141,070 | A | 8/1992 | Hickmann et al. |
| 5,271,269 | A | 12/1993 | Rilling et al. |
| 5,297,521 | A | 3/1994 | Sasaki et al. |
| 5,332,965 | A | 7/1994 | Wolf et al. |
| 5,431,141 | A | 7/1995 | Kanazawa et al. |
| 5,452,697 | A | 9/1995 | Sasaki et al. |
| 5,490,487 | A | 2/1996 | Kato et al. |
| 5,497,081 | A | 3/1996 | Wolf et al. |
| 5,517,966 | A | 5/1996 | Kanazawa et al. |
| 5,672,818 | A | 9/1997 | Schaefer et al. |
| 5,868,114 | A | 2/1999 | Kamimura et al. |
| RE39,257 | E | 9/2006 | Kamimura et al. |

FOREIGN PATENT DOCUMENTS

| | | | |
|---|---|---|---|
| DE | 3405935 | A1 | 8/1985 |
| DE | 3825702 | | 2/1990 |
| DE | 4024910 | | 4/1992 |
| DE | 4331700 | | 3/1994 |
| EP | 0084099 | A2 | 7/1983 |
| EP | 0 315 794 | A3 | 5/1989 |
| EP | 0 317 813 | A3 | 5/1989 |
| EP | 315794 | A3 | 5/1989 |
| EP | 317813 | A3 | 5/1989 |
| EP | 0 596 392 | A1 | 5/1994 |
| EP | 596392 | A1 | 5/1994 |
| EP | 0614205 | | 9/1994 |
| JP | 61-8441 | | 1/1986 |
| JP | 1-127347 | | 8/1989 |
| JP | 3-50338 | | 3/1991 |
| JP | 5-231894 | | 9/1993 |
| JP | 6-235334 | | 9/1993 |
| JP | 62-35334 | | 8/1994 |
| JP | 6-264777 | | 9/1994 |
| JP | 9-032588 | | 2/1997 |
| WO | 91/02890 | | 3/1991 |
| WO | 91/02891 | | 3/1991 |
| WO | 91/02891 | A1 | 3/1991 |
| WO | WO 91/02890 | | 3/1991 |

* cited by examiner

AIR FLOW RATE CONTROL APPARATUS

Matter enclosed in heavy brackets [ ] appears in the original patent but forms no part of this reissue specification; matter printed in italics indicates the additions made by reissue.

[This is a continuation of application Ser. No. 08/583,794, filed Jan. 16, 1996 abandoned.] *This application is a continuation of application Ser. No. 11/495,659, filed Jul. 31, 2006, now abandoned which is a continuation of application Ser. No. 10/685,537, filed Oct. 16, 2003, which is a continuation of application Ser. No. 09/779,710, filed Feb. 9, 2001, now U.S. Pat. No. RE 39,257, which is a reissue of application Ser. No. 08/969,708, filed Nov. 24, 1997, now surrendered U.S. Pat. No. 5,868,114, which is continuation of application Ser. No. 08/583,794, filed Jan. 16, 1996 now abandoned.*

BACKGROUND OF THE INVENTION

1. Field of the Invention

The present invention relates to a control apparatus for controlling the amount of air to be taken into an engine by electronically driving a control valve.

2. Description of the Related Art

Instead of the conventional method of directly controlling a control valve (throttle valve) by means of an operation of an accelerator pedal, a method is now used in an air flow rate control apparatus such that a position (opening degree) of the control valve is controlled by an actuator such as a motor in accordance with the operating status of an engine on a vehicle so that an optimal air intake can be obtained.

In such technology, an output associated with the operating status, for example an output from an accelerator sensor for detecting the extent of depression of the accelerator pedal is processed to set or determine a target (desired) opening degree of the control valve. A control signal is then sent to an actuator such as a motor to drive the throttle valve. Further, a throttle sensor for detecting the opening degree of the throttle valve is provided. Until its output value becomes equal to a value corresponding to the target opening degree of the control valve, a feedback control on the control valve is continued (Japanese Patent Laid-Open Publication No. 61-8441).

In recent years, there is a trend of integrating and incorporating the types of control such as ISC (idle speed control), FICD (fast idle control) into an electric air flow rate control apparatus, which had conventionally been performed by separate component parts.

In order to achieve this, it is required to reduce mechanical hysteresis and electrical hysteresis possessed by the electric air flow rate control apparatus and to improve the resolution of a potentiometer or the like which serves as a throttle sensor for detecting the position of the control valve.

Further, connectors for electrical wiring are respectively provided for the actuator such as a motor provided to control the position (opening degree) of the control valve (throttle valve) and for the position detecting means therefor, resulting in a problem that the number of the connectors becomes large.

SUMMARY OF THE INVENTION

Accordingly, in view of the above, it is an object of the present invention to reduce the number of component parts in the position detection means such as a potentiometer serving as a throttle sensor so as to reduce the mechanical hysteresis and electrical hysteresis thereof. It is thereby possible to improve the accuracy in controlling the position of a throttle valve.

It is another object of the present invention to provide an electric control apparatus capable of aggregating its connectors.

To this end, according to the present invention, provided is an air flow rate control apparatus for controlling an amount of air to be taken into an engine, comprising: a control valve disposed within an air flow passage through which the air flows; a body defining a portion of the air flow passage and rotatably accommodating the control valve; cover means attached to the body; a motor driven means for driving the control valve to a predetermined opening degree; means for detecting an opening degree of the control valve; an interface portion for allowing an electrical data exchange between the detection means and the driven means, and the outside of the apparatus through the interface portion; and a space defined by the cover and the body, accommodating the driven means and the detection means.

In the opening degree detection means in which a brush slides on a resistor and generates an output in accordance with its contacting position, the component parts thereof may be reduced with using the above construction, as compared with the conventional externally attached type one, so that it may be constructed from only a base board portion including a resistor and a brush portion. Since, accordingly, such elements as O-rings and springs which cause hysteresis may be removed, it is possible to reduce the mechanical hysteresis and electrical hysteresis which the conventional position detection means inherently posses. Thereby, it becomes possible to improve the accuracy in detecting the amount of depression of the accelerator pedal and the accuracy in detecting the position of the control valve. In other words, the accuracy is improved of control in regulating the control valve position where a target opening degree of the control valve is set in accordance with the status of operation and the control valve is accordingly driven by an actuator such as a motor. That is, a delicate position control such as ISC (idle speed control) and FICD (fast idle control) may be accurately performed.

By containing the position detection means and the control valve driver means within the same space, their input-output (interface) portions may be integrated or combined in the space into an integrated one. Further, by providing control means for processing the control signals, the output of the position detection means, or the like within the space, a length of wiring may be reduced. It is thereby possible to reduce an erroneous operation of the actuator such as a motor due to noise applied to the control signal to be sent to the actuator.

Further, by providing an air vent hole through which air is exchanged between the space and the engine room and which is faced towards the ground when mounted, a dew condensation due to a temperature change in the engine room may be prevented, and the pressure difference between the inside and the outside of the space may be removed to eliminate a sucking of water, dust or the like.

DESCRIPTION OF THE PREFERRED EMBODIMENTS

Figure 1:
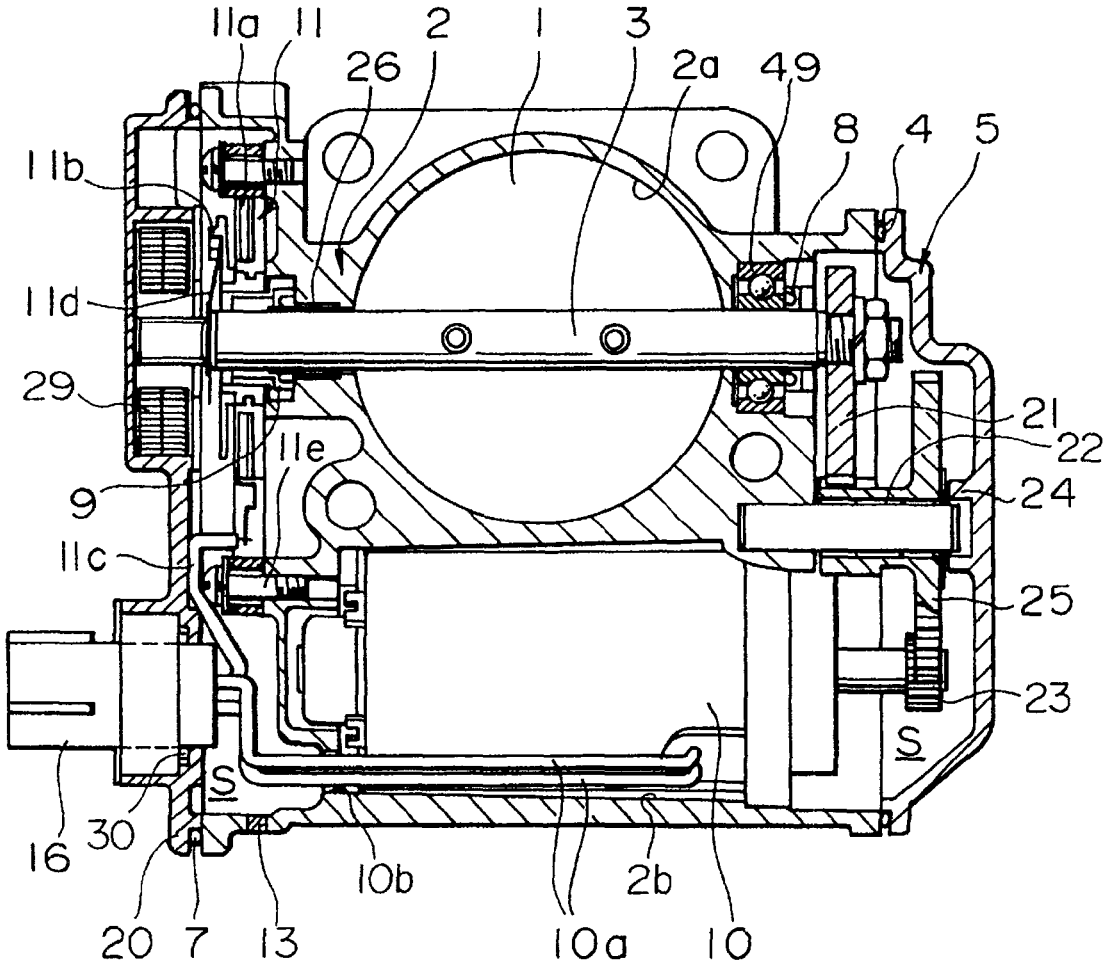
FIG. 1 is a sectional view of an embodiment of the present invention.
Figure 3:
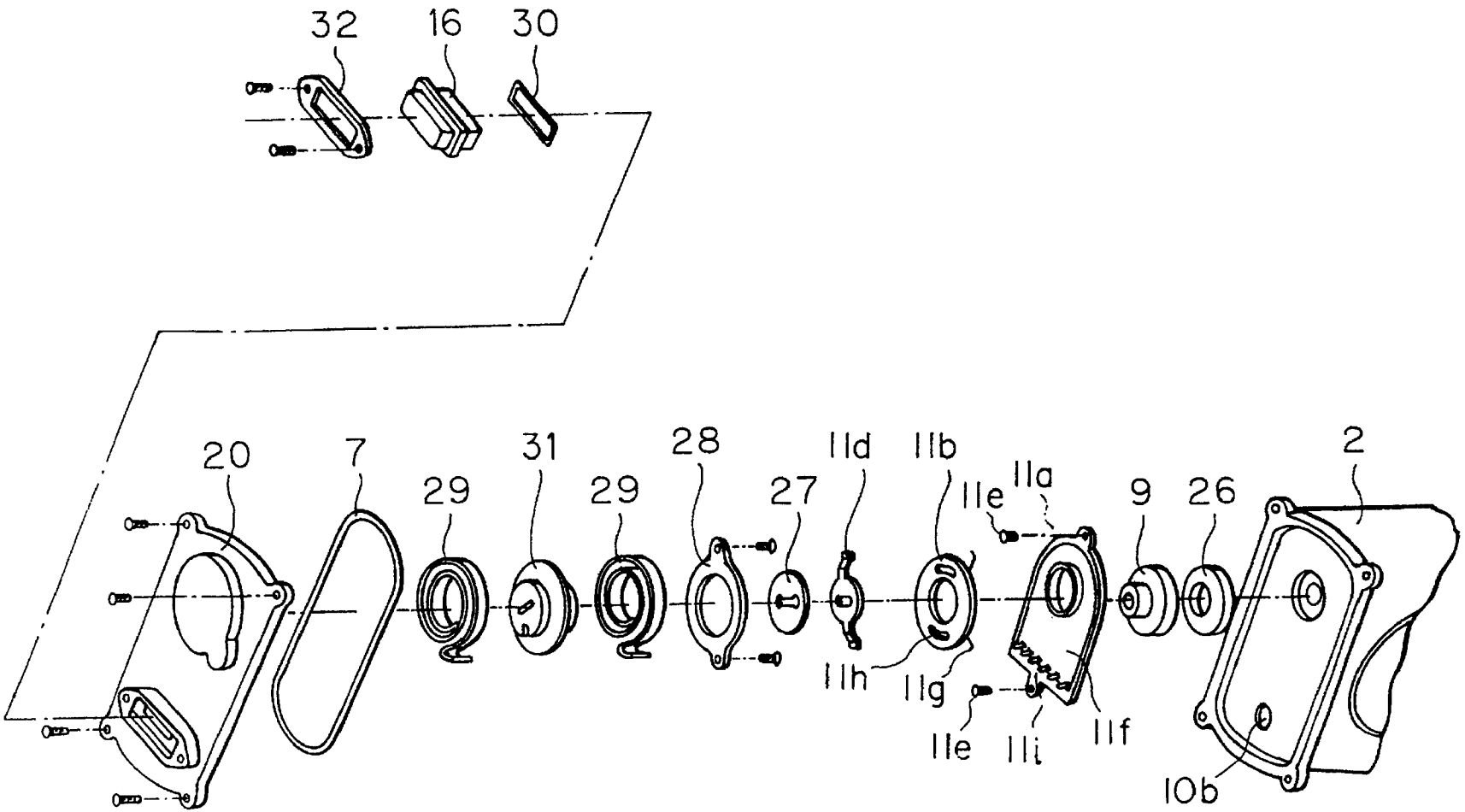
FIG. 3 is an exploded view of the apparatus as shown in FIG. 1.

Referring to FIGS. 1 and 3, in an embodiment of the present invention, a control valve includes a valve element 1 fixedly mounted onto a valve shaft 3 which is pivotably mounted in a body 2 through a bearings 49. The control valve element 1 is swingeably housed within a flow passage 2a of the body 2 through which air flows to an engine. Dust seals 8 and 9 serving as sealing members are provided on opposite end portions of the valve shaft 3. A gear cover 5 with an O-ring 4 and a spring cover 20 with an O-ring 7 are attached to the body 2 to define thereamong a sealed space S. Since the sealed space S is constructed so as to prevent the penetration of foreign matter, a throttle sensor 11 for detecting an actual opening degree of the control valve, which is to be disposed within such sealed space, may be constructed from only a board 11a and a brush 11b. The board 11a is provided thereon with a resister on which the brush 11b slides. The number of component parts of the throttle sensor 11 may be reduced as compared with the conventional throttle sensors that are externally attached to the body 2. The mechanical hysteresis and electrical hysteresis thereof may thus be reduced. Accordingly, improved accuracy of control may be achieved in controlling the position of the control valve.

Further, a DC motor 10 for driving and controlling the control valve element 1 through a reducing gear means 21 and a gear 25 is disposed with the throttle sensor 11 within the sealed space S. Lead wires 10a of the DC motor 10 and lead wires 11c of the throttle sensor 11 are aggregated into a single connector 16. Therefore, the number of connectors can be reduced, as compared with the conventional product.

Figure 4:
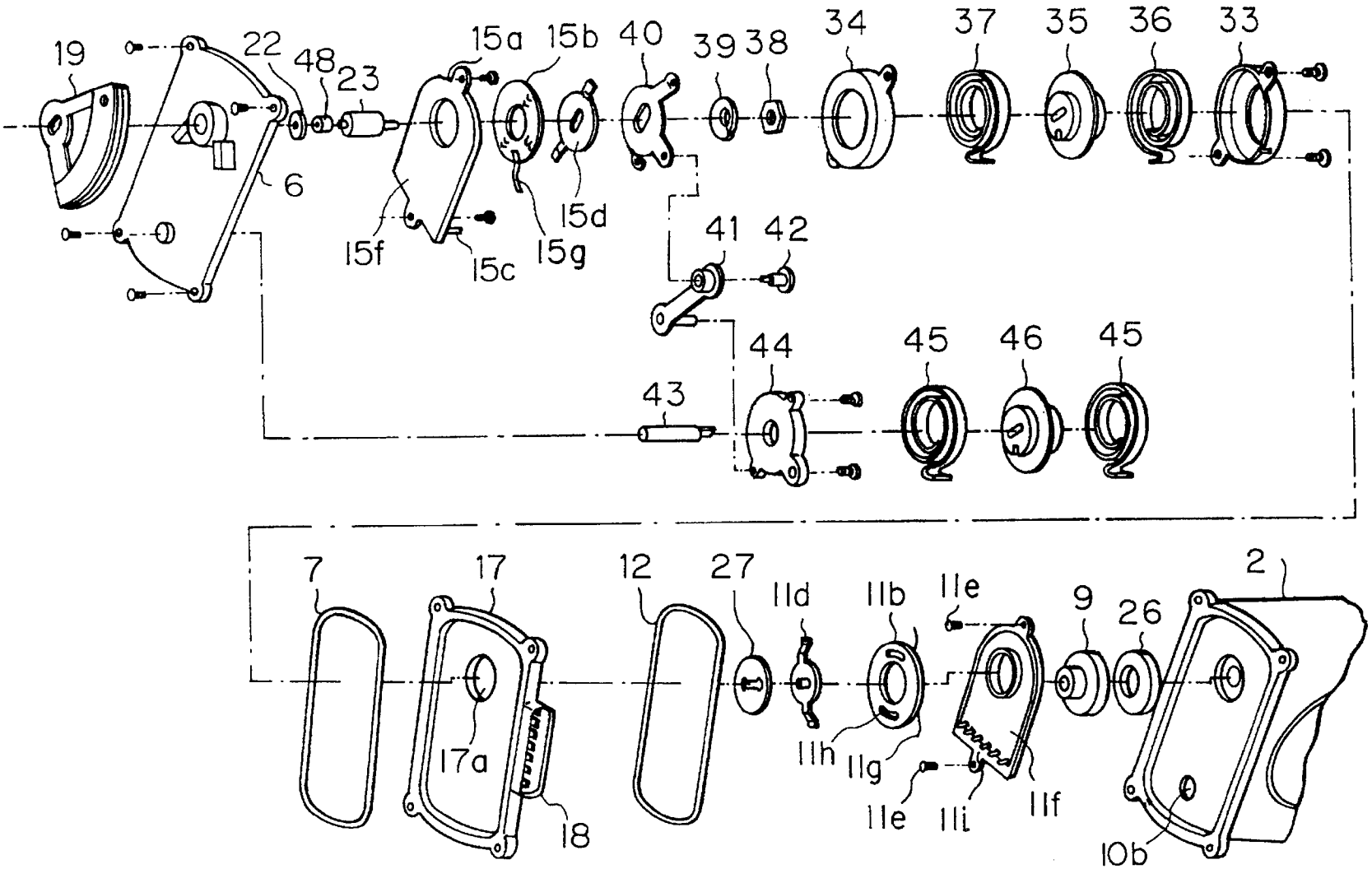
FIG. 4 is an exploded view of the apparatus as shown in FIG. 2.

Another embodiment will be described hereinafter with reference to FIGS. 2 and 4.

In the case of this embodiment, a sealed space S is defined by the body 2, dust seals 8 and 9 on opposite end portions of the valve shaft 3 supported in the body 2, a gear cover 5 with an O-ring 4 attached to the body 2, a control unit 17 attached the body 2 through a gasket 12, and an accelerator cover 6 attached to the body 2 through an O-ring 7, through a bottom of which cover 6 an accelerator shaft 23 extends outwards beyond a dust seal 22. A throttle sensor 11 is mounted on the valve shaft 3 and held in a space portion defined by the body 2, the gasket 12 and the control unit 17 through a ring 27.

The valve shaft 3 is rotatably supported by a metal bearing 26 press-fitted to the body 2 made by aluminum alloy die casting. The valve shaft 3 includes a part thereof extended out of the metal bearing 26, to which a sealing mechanism is applied. The sealing mechanism includes a metal (stainless) bushing 9 press-fitted at an outer periphery thereof to a recess portion of the body 2. The metal bushing 9 is provided with a sleeve portion 9b extending towards an end of the valve shaft 3. A sealing rubber ring 9a is disposed between an outer periphery of the valve shaft 3 and an inner periphery of the metal bushing 9.

A metal bushing 11c of the throttle (position) sensor 11 is fitted to the sleeve portion 9b of the metal bushing 9 to support the position sensor 11. A slider 11b is rotatably mounted to an outer periphery of the metal bushing 11c.

Figure 2:
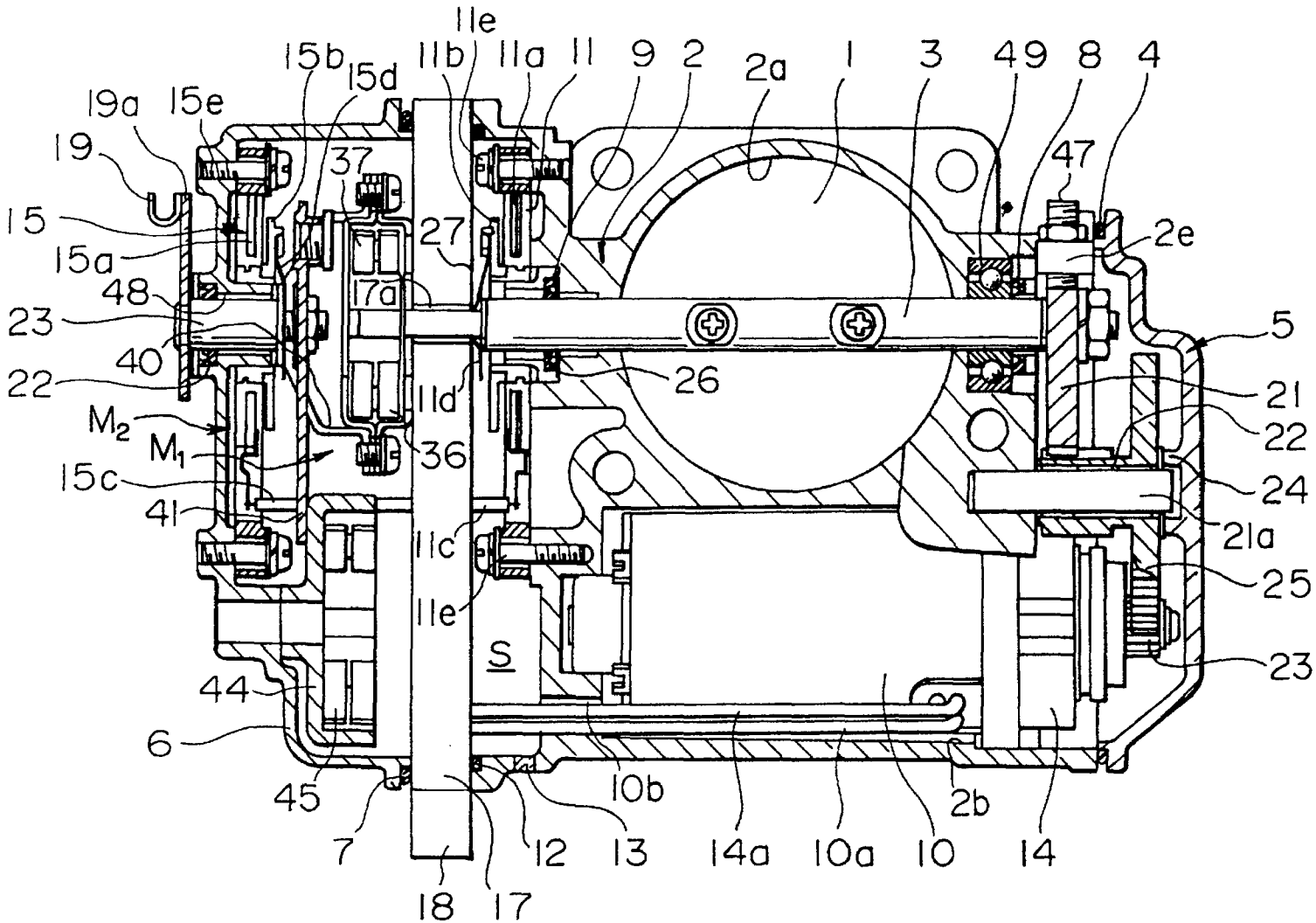
FIG. 2 is a sectional view of another embodiment of the present invention.

The slider 11b is urged at an outer surface thereof by a spring lid to bring a slider element 11g into contact with a conductive pattern 11f printed on a substrate 11a under a desired pressure (see FIG. 2).

The spring lid is fixed to an end portion of the valve shaft 3c through a law washer 27. An engagement 11h prevents the spring lid from the rotational movement. As a result, rotation of the valve shaft 3 is transmitted to the slider 11b.

The substrate 11a is screw-mounted to the body 2 through screws 11a (see FIGS. 1 and 2).

In this embodiment, the positioning of the substrate 11a and the slider 11b substantially depends on a relative position between the metal bearing 26 and the valve shaft 3, and on a relative position between the metal bushing 9 and the metal bushing 11c. The metal bushings 9 and 11c which serve as primary factors are made of metal. Therefore, as compared with the bushings made of material other than metal, these metal bushings are excellent in the accuracy of machining and assembling, and in aged deterioration.

A recess portion of the body 2 for the metal bushing 9 is machined coaxially with the metal bearing 26 for the valve shaft 3. The substrate 11a is assembled to the body 2 by means of mounting the metal bushing 11c onto the sleeve portion 9b of the metal bushing 9, which bushing 11c is machined coaxially with the sleeve 9b.

A lost motion mechanism M1, an accelerator sensor 15, and a throttle lever returning mechanism M2 are disposed within a space portion defined by the control unit 17, the O-ring 7 and the cover 6. The lost motion mechanism M1 is mounted on the accelerator shaft 23 and includes lost motion springs 36, 37, a spring holder 35, spring plates 33, 34. These space portions are communicated with each other through a annular gap between a bore formed in the control unit 17 and a part of the valve shaft 3 which extends through such bore. The valve shaft 3 engages with a throttle sector 19 through the lost motion mechanism M1.

The sealed space S houses therein the throttle sensor 11 for detecting the actual opening degree of the throttle (control) valve 1, the DC motor 10 for driving and controlling the control valve shaft 3 with the valve element 1 fixedly mounted thereon through a reducing gear means 21, an electromagnetic clutch 14 for selectively disconnecting the DC motor 10 from the reducing gear means 21, the accelerator sensor 15 for detecting the position of the throttle sector 19 which is turned in accordance with the amount of depression of the accelerator pedal, and the control unit 17 for processing the output signals from the throttle sensor 11 and the accelerator sensor 15 and the control command signals.

The assembly of the accelerator sensor 15 will be described hereinafter with referring to FIGS. 2 and 8.

A metal bushing 48 is fitted to a resin cover 6, which bushing 48 is arranged coaxially with the valve shaft 3. The metal bushing 48 supports the accelerator shaft 23. An accelerator lever 19a is fixed to one end portion of the shaft 23 out of the cover 6. A washer 23a is disposed between the accelerator lever 19 and the cover 6 for closing a hole formed in the cover 6, through which the shaft 23 extends. An annular rubber seal 22 is disposed axially between the washer 23a and the metal bushing 48, and is rested within an annular recess portion of the cover 6 so as to resiliently come into contact with an outer periphery of the accelerator shaft 23.

The cover 6 is provided with a tubular sleeve portion 6a extending along a longitudinal direction of the metal bushing 48 into the space S.

A metal bushing 15c is provided in a center portion of a substrate 15a of the accelerator sensor 15. The metal bushing 15c is fixed to an outer periphery of the sleeve portion 6a of the cover 6. The metal bushing 15c is provided with a sleeve portion which projects along the accelerator shaft 23 from a surface of the substrate 15a into the space S. A slider 15b of the accelerator sensor 15 is embedded into such sleeve portion.

A washer 23b, a spring 15d, a connecting plate 40 and a washer 39 are fitted in order into a threaded portion 23c of the other end of the accelerator shaft 23. Finally, a nut 38 is fastened to the threaded portion 23c to hold these element on the accelerator shaft 23.

In this occasion, the spring 15d applies a desired axial urging force to the slider 15b. The spring 15d is abutted against the engagement 15h formed in the slider 15b and then can be rotatable together with the slider 15b. As a result, a rotation of the accelerator shaft 23 is transmitted to the slider 15b, and then the slider 15g (FIG. 4) slides on the conductive pattern 15f of the substrate 15a.

The substrate 15a is screw mounted onto an inner surface of the cover 6 facing the space S by screws 15e.

The connecting plate 40 is connected to an end (throttle sensor 11 side) of the valve shaft 3, which extends through a hole 17a of the substrate 17, through the lost motion mechanism M1.

Accordingly, the accelerator sensor 15 can be assembled coaxially to the accelerator shaft 23 with higher precision.

When the accelerator pedal is depressed to a predetermined position, the rotational force is transmitted from the accelerator shaft 23 to the valve shaft 3 through the lost motion mechanism M1. Accordingly, in case that the motor 10 is not work, when the accelerator pedal is depressed hardly or strongly, the throttle valve can be opened mechanically. Therefore, even though the motor is broken, it can be possible to maintain a running of the vehicle. This is a so-called fail-safe mechanism.

Figure 7:
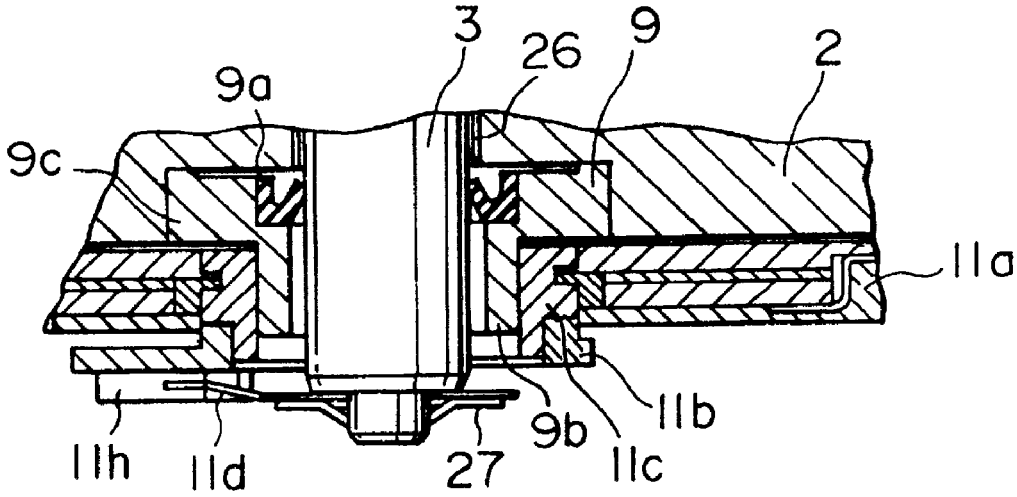
FIG. 7 is a partially fragmentary sectional view showing the control valve opening degree detection means of the apparatus of FIG. 2.

The throttle sensor 11 and accelerator sensor 15 may be constructed, as described above, from the base board 11a, 15a on which a resistor is printed or mounted, and the brush 11b, 15b (FIGS. 7 and 8), so that they are constructed as having a smaller number of component parts and reduced mechanical hysteresis and electrical hysteresis.

Figure 5:
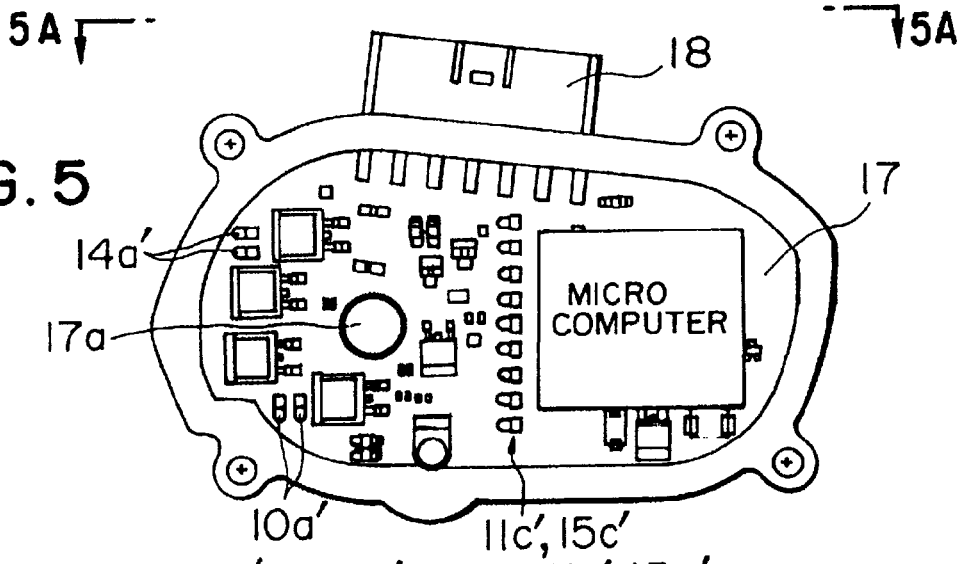
FIG. 5 is a plan view showing the control unit shown in FIG. 2.
Figure 5A:
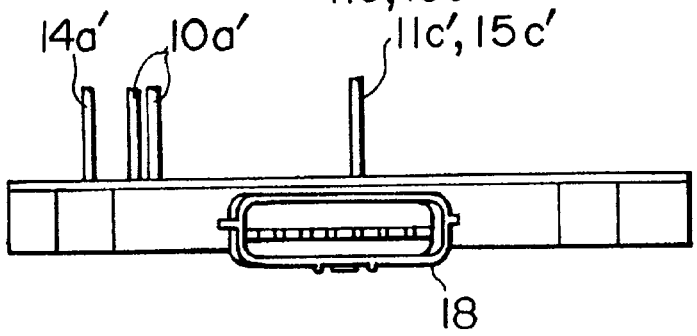
FIG. 5A is a side view taken along the line A—A of FIG. 5.
Figure 6:
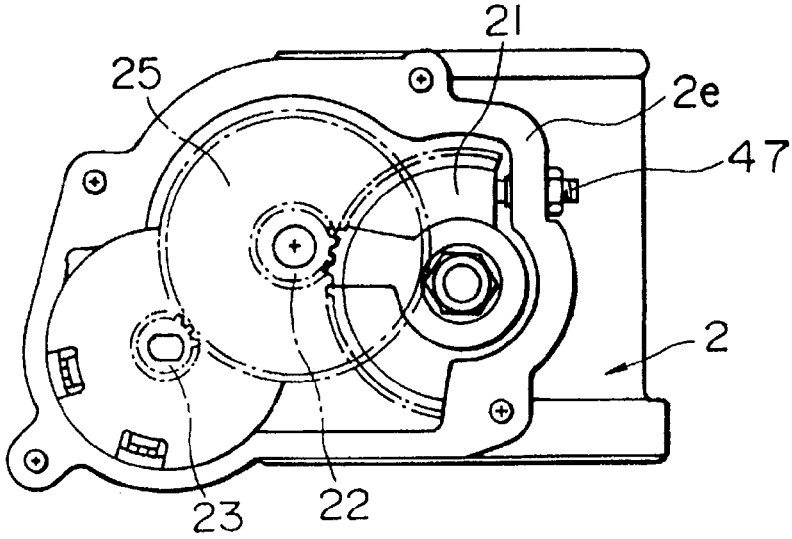
FIG. 6 is a side view showing an end portion of the control valve shaft of the apparatus of FIG. 2.

Further, a lead wire 10a of the DC motor 10, a lead wire 14a of the electromagnetic clutch 14, a lead wire 11c of the throttle sensor 11 and a lead wire 15c of the accelerator sensor 15 are connected to the control unit 17 within the sealed space S (FIGS. 5 and 5A). The data exchange between these elements and the outside is conducted through a connector 18. It is thereby possible to eliminate the respective connectors of these elements. Furthermore, since the wiring from the control unit 17 to the DC motor 10, the throttle sensor 11 and the accelerator sensor 15 may be reduced in length, the apparatus has an improved reliability against an erroneous operation due to noise.

The control unit 17 is shown in detail in FIGS. 5 and 5A. The control unit 17 includes a micro computer with terminals 11c' and 15c' to which signal lines 11c and 15c from the throttle sensor 11 and the accelerator sensor 15, and lines (not shown) to a clutch control circuit and a motor control circuit are connected. Lead lines 14a of the clutch 14 and the lead lines 10a of the motor 10 are connected to output terminals 10a' of the motor control circuit and output terminals 14a' of the clutch control circuit, respectively.

The lead lines of the motor 10 and the clutch 14 are gathered in the control unit 17, and then connected to an external power supply through the connector 18. The signals from the throttle sensor 11 and the accelerator sensor 15 are delivered to the control unit 17 and outputted outside through the connector 18.

A detailed description will now be given with respect to the lost motion (fail-safe) mechanism M1.

The valve shaft 3 and the accelerator shaft 23 are disposed coaxially and coupled with each other through the lost motion mechanism M1. The throttle sensor 11 is mounted on the valve shaft 3 while the accelerator sensor 15 is mounted on the accelerator shaft 23. The lost motion mechanism M1 is constructed by the lost motion springs 36, 37, the spring holder 35 for holding these springs, and the spring plates 33, 34 cooperating to incorporate therein the springs 36, 37 and the spring holder 35. Further, the spring plates 33, 34 are rigidly fixed to the accelerator shaft 23 through a connecting plate 40. The spring holder 35 is rigidly connected to the valve shaft 3. The spring holder 35 is connected to the spring plates 33 and 34, respectively through the springs 36 and 37.

In a normal operation, the throttle valve is driven by the motor 10 and an output of the throttle sensor 11 is sent to the control unit 17. Further, at this time, since the forces respectively generated from the lost motion springs 36 and 37 are opposite in direction to each other, the torque generated by the motor is absorbed by those springs and then not directly transmitted to the operator through the throttle sector 19.

In an abnormal operation, the motor 10 and the throttle shaft 3 are disconnected from each other by the electromagnetic clutch 14. Upon the operator depresses the accelerator pedal, the throttle sector 19 is turned to rotate the connecting plate 40 and the spring plates 33, 34. As a result, the spring force of the lost motion spring 36 and the spring force of the lost motion spring 37 (which have been balanced in the normal operation) lose their balance. Such unbalance rotates the spring holder 35 whereby it is possible to mechanically move the throttle valve.

A return spring mechanism for imparting a returning force to the throttle sector 19 is constructed by a shaft 43 retained in the accelerator cover 6, a spring cover 44, a spring holder 46 and returning springs 45, 45 held in the holder 46. The spring holder 46 is rigidly fixed to the shaft 43 so as to make no rotation of the spring holder 46. A torque generated by the spring 45 rotates the spring cover 44 and then is transmitted to the connecting plate 40 on the accelerator shaft 23 through the connecting lever 41, thereby imparting a returning force to the throttle sector 19.

An apparatus may be compact and the plating over the springs is not required, since the valve shaft 3 and the accelerator shaft 23 are coaxially arranged, and the throttle sensor 11 and the accelerator sensor 15 are mounted on the respective shafts 3 and 23, and the shaft 43 of the return spring mechanism and the accelerator shaft 23 are juxtaposed with each other and are disposed within the accelerator cover 6.

Further, as shown in FIGS. 1 and 2, by providing a vent hole 13 for draining water and air, on the valve body 2 for supporting the valve shaft 3, a dew condensation on the throttle sensor 11 or the accelerator sensor 15 may be prevented. In addition, a sucking of water into the sealed space S may be eliminated by removing the pressure difference between the interior and the exterior of the sealed space S due to the vent hole 13.

A gear 23 is fixed to an end of a rotary shaft of the motor 10. The gear 23 engages with an intermediate gear 25 fixed to a shaft 21a supported by the body 2 and the cover 5. The intermediate gear 25 is provided with a smaller gear 22 formed integrally therewith. The smaller gear 22 engages with a gear 21 fixed to the end of the valve shaft 3. According this, a rotational speed of the motor 10 is reduced while a rotational torque thereof is increased, thereby obtaining a rotational speed and a rotational torque required for driving the throttle valve.

The gear 21 is shaped in a semi-circular. A straight edge of the gear 21 is adapted to abut against a stopper 47 when the valve element 1 is moved to be almost full close position.

Under an electric control, a full close position of the valve element 1 is so arranged that the gear 21 does not abut against the stopper 47. When the electric control is released, the valve element 1 is further moved so that the gear 21 abuts against the stopper 47. This is a mechanical full close position.

In case that the valve element 1 is swung to the mechanical full close position, a large inertia force is applied to the stopper 47. In order to counteract such inertia force, the stopper 47 is firmly screw mounted to a seat 2e of the body 2, but. The stopper 47 includes a threaded portion to adjust the position thereof.

As has been described above, according to the present invention, it is possible to provide an air flow rate control apparatus in which the mechanical hysteresis and the electrical hysteresis may be reduced based on an arrangement which is superior in cost performance, and the accuracy of the throttle position control in controlling the position of an actuator such as a motor is improved.

Figure 8:
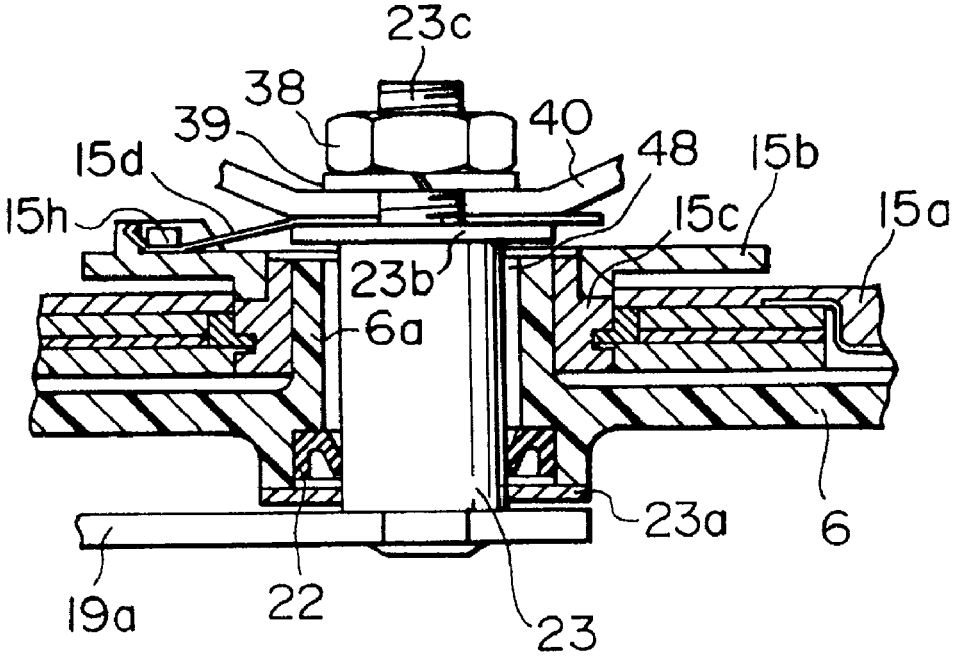
FIG. 8 is a partially fragmentary sectional view showing the acceleration sensor portion of the apparatus of FIG. 2.

Incidentally, the covers 5, 6 and 20 can be made of resin such as PBT (Polybutyleneterephthalate) with 30% glass fiber filler, as shown in FIG. 8.

What is claimed is:

[1. An air flow rate control apparatus for controlling an amount of air to be taken into an engine, comprising:

a control valve disposed within an air flow passage through which an air flows;

a body defining a portion of the air flow passage and rotatably accommodating said control valve;

a cover attached to said body;

a motor driven means for driving said control valve to a predetermined opening degree;

a switching means for selectively disconnecting said driven means from said control valve;

a detector for detecting a rotational position of a valve shaft to which said control valve is mounted as an opening degree of said control valve said detector disposed at an end portion of said valve shaft opposite to said motor driven means; and a controller for processing a controlled variable of an opening degree of said control valve in accordance with a detection signal from the detector and outputting to said driven means a command signal corresponding to said controlled variable; and an interface portion allowing an electrical data exchange among said detector, said driven means and said controller, and/or an electrical data exchange between these components and the outside of said apparatus through said interface portion, said interface portion disposed at the same side of said valve shaft as said detector is.]

[2. A motor driven throttle valve system comprising:

a throttle body in which a throttle valve is mounted;

a recess portion provided adjacent said throttle valve for housing therein a motor for driving said throttle valve; and a through hole for communicating said recess portion the outside thereof, through which an electric wire extends from said motor to the outside.]

[3. A motor driven throttle valve system comprising:

a throttle body with an air intake passage;

a throttle valve element disposed in said air intake passage for changing an effective cross sectional area of said passage a throttle shaft rotatably mounted in said throttle body for swinging said throttle valve element;

a motor for driving said throttle shaft through gear means provided on one end portion of said throttle shaft;

a position sensor provided on the other end portion of said throttle shaft for detecting a rotational displacement of said shaft;

a recess portion provided in said throttle body adjacent said throttle valve element for housing therein a motor for driving said throttle valve;

a through hole for communicating said recess portion with the outside thereof, through which an electric wire extends from said motor to the outside;

a cover member attached to said throttle body for covering said position sensor, through which electric wires from said motor and said position sensor extend out of the system.]

[4. A motor driven throttle valve system comprising:

a body provided therein with an air intake passage;

a shaft rotatably mounted in said body;

a throttle valve element fixedly mounted to said shaft for changing an effective cross sectional area of said passage in accordance with a swing of said shaft;

a cover attached to said body to define therebetween a space;

a sensor disposed within said space for detecting an angular displacement of said shaft;

a motor mounted to said body;

a mechanism for transmitting a rotational torque from said motor to said shaft; and a connector mounted to said cover, said connector including an output terminal of said sensor and an input terminal of said motor means.]

[5. A motor driven throttle valve system according to claim 1, further comprising a lost motion spring mechanism for applying a rotational force against said shaft so as to characterize a transmission characteristic of a torque to be transmitted from said motor to said shaft through said torque transmission mechanism, said spring mechanism being disposed within said space.]

[6. A motor driven throttle valve system according to claim 1, wherein said means and said torque transmission mechanism are provided on opposite end portions of said shaft.]

[7. A motor driven throttle valve system according to claim 6, further comprising a lost motion spring mechanism for applying a rotational force against said shaft so as to characterize a transmission characteristic of a torque to be transmitted from said motor to said shaft through said torque transmission mechanism, said spring mechanism being disposed within said space.]

[8. An air flow rate control apparatus for controlling an amount of air to be taken into an engine, comprising:

a control valve disposed within an air flow passage through which said air flows;

a body defining a portion of said air flow passage and rotatably accommodating said control valve;

a cover attached to said body;

a motor driven means for driving said control valve to a predetermined opening degree;

a detector for detecting a rotational position of a valve shaft to which said control valve is mounted as an opening degree of said control valve, said detector disposed at an end portion of said valve shaft opposite to said motor driven means; and an interface portion for allowing an electrical data exchange between said detector and said driven means, and the outside of said apparatus through said interface portion, said interface portion disposed at the same side of said valve shaft as said detector is.]

[9. An apparatus according to claim 8, wherein an opening for allowing a communication between said space and the outside thereof is provided.]

[10. An apparatus according to claim 8, wherein said interface portion is provided on said cover.]

[11. An apparatus according to claim 8, wherein said driven means further comprises a switching means capable of selectively disconnecting said driven means from said control valve.]

[12. An apparatus according to claim 11, wherein an opening for allowing a communication between said space and the outside thereof is provided.]

[13. An apparatus according to claim 11, wherein said interface portion is provided on said cover.]

[14. A throttle valve system comprising:

a throttle body with an air intake passage;

a throttle valve element disposed in said air intake passage for changing an effective cross sectional area of said passage;

a throttle valve shaft rotatably mounted on a bearing in said throttle body for swinging said throttle valve element;

a first metal bushing press-fitted at an outer periphery thereof to a recess portion of said throttle body and coaxially said throttle shaft; and a throttle position sensor, said sensor including:

a sensor element;

a second metal bushing fitted to said first metal bushing to support said sensor element;

a slider rotatably mounted to said second metal bushing;

a transmitting member provided between said throttle valve shaft and said slider thereby said slider is rotated by said throttle valve shaft;

a conductive element provided on the surface of said throttle position sensor element; and a slider element mounted on said slider for providing electrical contact to said conductive element.]

[15. A system according to claim 14, wherein a sealing rubber ring is provided between an inner periphery of said first metal bushing and an outer periphery of said throttle valve shaft.]

[16. A system according to claim 14, wherein said slider is axially urged by means of a spring, thereby being in contact with said conductive element at a predetermined contact pressure.]

[17. A motor driven throttle valve system comprising:

a throttle body with an air intake passage;

a throttle valve element disposed in said air intake passage for changing an effective cross sectional area of said passage;

a throttle valve shaft rotatably mounted in said throttle body for swinging said throttle valve element;

a motor for driving said throttle valve shaft through gear means provided on one end portion of said throttle valve shaft;

a throttle position sensor provided on the other end portion of said throttle valve shaft for detecting a rotational displacement of said throttle valve shaft;

a recess portion provided in said throttle body adjacent said throttle valve element for housing therein said motor;

a microcomputer electrically connected to said throttle position sensor and said motor; and a cover member attached to said throttle body for covering said throttle position sensor and said microcomputer.]

[18. A system according to claim 17, said throttle position sensor is covered by a control unit attached to said throttle body, and wherein said microcomputer is attached to said control unit, and wherein said control unit is covered by said cover member.]

[19. A system according to claim 17, wherein said microcomputer is electrically connected to an accelerator position sensor.]

[20. A system according to claim 19, wherein said accelerator position sensor is attached to said cover.]

*21. An airflow rate control apparatus of an engine comprising:*

*a throttle valve for controlling an airflow rate of the engine;*

*a throttle shaft rotatably supporting the throttle valve with respect to a throttle body;*

*a motor for the throttle shaft;*

*a speed reduction gear mechanism for transmitting rotation of the motor to said gear;*

*a ball bearing attached to the throttle body to support the throttle shaft on the speed reduction mechanism side thereof;*

*a gear cover attached to the throttle body to cover the speed reduction gear mechanism; and*

*a sealing mechanism provided between the throttle shaft and the throttle body so as to achieve a seal between the speed reduction mechanism and the ball bearing.*

*22. An apparatus according to claim 21, wherein said gear cover is fixed to the throttle body, and a sealing member is interposed therebetween.*

*23. An apparatus according to claim 21, wherein a stopper is formed in said gear cover for restricting a thrust position of an intermediate gear of the speed reduction gear.*

*24. An apparatus according to claim 21, wherein*

*said gear attached to the throttle shaft has a shape which is lacking a part thereof in a circumferential direction, and*

*the throttle body is provided with a stopper for receiving a lacked end surface of the lack portion of the gear attached to the throttle shaft.*

*25. An apparatus according to claim 24, wherein said stopper is fixed to an attachment seat of the throttle body.*

*26. An apparatus according to claim 25, wherein said stopper is constituted by an adjustable screw.*

*27. An apparatus according to claim 21, further comprising a bearing bore formed in the throttle body, through which bore said throttle shaft extends; a cover attached to the throttle body to cover an end of the throttle shaft; and a throttle sensor for detecting rotation of the throttle shaft; wherein said throttle sensor is provided with a sliding resistor and a brush.*

*28. An apparatus according to claim 27, wherein said brush is rotated with the throttle shaft.*

*29. An apparatus according to claim 27, wherein*

*one end of the throttle shaft on a side on which the throttle sensor is provided is supported by a metal bearing provided in the throttle body, and*

*said sealing mechanism is provided in a portion of the throttle shaft, which portion protrudes from the metal bearing.*

*30. An apparatus according to claim 29, wherein said sealing mechanism comprises a metal bushing pressed into a recess portion of the throttle body around the protruding*

*portion of the throttle shaft from the metal bearing, and a rubber seal installed between the metal bush and a periphery of the throttle shaft.*

*31. An apparatus according to claim 27, wherein said throttle sensor comprises a resistor circuit board fixed to the throttle body, and a brush fixed to the throttle shaft so as to slide on a resistor body of the resistor circuit board.*

*32. An apparatus according to claim 31, wherein*

*a metal bushing having a sleeve is pressed into a recess portion of the throttle body, the recess portion being located around a portion of the throttle shaft protruding from the bearing bore;*

*another metal bushing is rotatably supported by the sleeve of the metal bushing; and*

*said throttle sensor comprises a brush attached to said other metal bushing.*

*33. An airflow rate control apparatus of an engine comprising:*

*a throttle valve for controlling an airflow rate of the engine;*

*a throttle shaft rotatably supporting the throttle valve with respect to a throttle body;*

*a gear fixed to one end of the throttle shaft;*

*a motor fixed to the throttle body;*

*a speed reduction gear mechanism for transmitting rotation of the motor to the gear;*

*a ball bearing attached to the throttle body to support the throttle shaft on the speed reduction mechanism side thereof; and*

*a metal bearing attached to the throttle body to support the throttle shaft on the opposite side to the speed reduction gear mechanism side thereof.*

*34. An apparatus according to claim 33, further comprising a bearing bore formed in the throttle body, through which bore said throttle shaft extends; and a cover attached to the throttle body to cover an end of the throttle shaft; wherein said throttle sensor is provided with a sliding resistor and a brush.*

*35. An apparatus according to claim 34, wherein said brush is rotated with the throttle shaft.*

*36. An apparatus according to claim 33, further comprising a sealing mechanism provided between the throttle shaft and the throttle body to achieve a seal between the speed reduction mechanism and the ball bearing.*

*37. An apparatus according to claim 36, further comprising a sealing mechanism provided between the throttle body and a periphery of the throttle shaft protruding from the metal housing.*

* * * * *